United States Patent
Draaijer

(10) Patent No.: US 9,560,726 B2
(45) Date of Patent: Jan. 31, 2017

(54) SYSTEM AND METHOD FOR REMOTE CONTROL OF ELECTRICAL APPLIANCE USING REFLECTED LIGHT

(71) Applicant: PHILIPS LIGHTING HOLDING B.V., Eindhoven (NL)

(72) Inventor: Maurice Herman Johan Draaijer, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/646,029

(22) PCT Filed: Nov. 14, 2013

(86) PCT No.: PCT/IB2013/060135
§ 371 (c)(1),
(2) Date: May 20, 2015

(87) PCT Pub. No.: WO2014/080321
PCT Pub. Date: May 30, 2014

(65) Prior Publication Data
US 2015/0289350 A1    Oct. 8, 2015

Related U.S. Application Data

(60) Provisional application No. 61/729,683, filed on Nov. 26, 2012.

(51) Int. Cl.
*H05B 37/02* (2006.01)
*G08C 23/04* (2006.01)

(52) U.S. Cl.
CPC ........... *H05B 37/0272* (2013.01); *G08C 23/04* (2013.01); *H05B 37/0218* (2013.01)

(58) Field of Classification Search
CPC .................... H05B 37/0272; H05B 39/088
(Continued)

(56) References Cited

U.S. PATENT DOCUMENTS

| 5,408,550 A | 4/1995 | Lefevre |
| 6,714,310 B1 * | 3/2004 | Tanaka ................. G01B 11/002 356/614 |

(Continued)

FOREIGN PATENT DOCUMENTS

| DE | 19708460 C1 | 2/1998 |
| EP | 2509398 A1 | 10/2012 |

(Continued)

OTHER PUBLICATIONS

Melanson, Donald "EnOcean's Wireless Battery-Less Light Switched", Apr. 2005.

*Primary Examiner* — Jason M Crawford

(57) ABSTRACT

The invention addresses the problem of dependency of wireless control systems for electrical appliances on pre-existing control switches along with limited switching functionality. It relates to a system (1,50) for wirelessly controlling an electrical appliance (100). By providing the system with an input unit (5,25,55) comprising a user-operable command interface (9,19,49,59) and a control device (3,30) which is connectable to said electrical appliance, wherein said input unit is located remotely from said control device, and said control device is adapted to detect a light signal being reflected off said command interface, to allocate said light signal to a predetermined command and to output said command to the electrical appliance, it is possible to rely on light manipulation when being reflected, without need of connection to the electrical wiring present in a building.

15 Claims, 4 Drawing Sheets

(58) Field of Classification Search
USPC .......................................................... 398/172
See application file for complete search history.

(56) References Cited

U.S. PATENT DOCUMENTS

| | | | |
|---|---|---|---|
| 8,188,878 B2* | 5/2012 | Pederson | G07C 9/00158 340/815.45 |
| 9,119,236 B1* | 8/2015 | Martin | H05B 37/02 |
| 2004/0090524 A1 | 5/2004 | Belliveau | |
| 2006/0097890 A1 | 5/2006 | Atkins | |
| 2008/0265799 A1* | 10/2008 | Sibert | H05B 37/0245 315/292 |
| 2008/0317471 A1 | 12/2008 | Yuan | |
| 2010/0025209 A1 | 2/2010 | Rister | |
| 2010/0231363 A1* | 9/2010 | Knibbe | H04L 12/2803 340/286.02 |
| 2012/0019493 A1* | 1/2012 | Barnhoefer | H05B 33/0851 345/207 |
| 2014/0300276 A1* | 10/2014 | Wang | H04L 12/2807 315/151 |
| 2014/0312780 A1* | 10/2014 | Vissenberg | G01B 11/026 315/153 |

FOREIGN PATENT DOCUMENTS

| | | |
|---|---|---|
| WO | 2008065579 A1 | 6/2008 |
| WO | 2012035469 A1 | 3/2012 |

\* cited by examiner

US 9,560,726 B2

SYSTEM AND METHOD FOR REMOTE CONTROL OF ELECTRICAL APPLIANCE USING REFLECTED LIGHT

CROSS-REFERENCE TO PRIOR APPLICATIONS

This application is the U.S. National Phase application under 35 U.S.C. §371 of International Application No. PCT/IB2013/060135, filed on Nov. 14, 2013, which claims the benefit of U.S. Provisional Patent Application No. 61/729,683, filed on Nov. 26, 2012. These applications are hereby incorporated by reference herein.

FIELD OF THE INVENTION

The invention relates to a system for wirelessly controlling electrical appliances, in particular lighting apparatuses. Further, the invention relates to a control device and to an input unit for use in such a system. Still further, this invention relates to a method of controlling electrical appliances, in particular lighting apparatuses, and to a computer program for operating said system.

BACKGROUND OF THE INVENTION

In the field of electrical appliances, in particular in the field of lighting systems, said systems and apparatuses are in some instances already installed during construction of a building. In most cases, however, those apparatuses and systems are installed only after construction of a building, when a room has already been finished. Within the building or room where the apparatuses or systems are to be installed, there is typically only limited access to electrical wires for providing electrical power supply to the electrical appliance itself on one hand side and to a control device, e.g. a switch, on the other hand side.

Control devices, e.g. control switches, are typically mounted on walls in a height within reach of a user. Accordingly, there are only limited options for installing control devices like control switches without having to install additional wires. Installing additional wires is however considered to be a major disadvantage, and as such sought to be prevented at all costs, as it either requires installation on wall surfaces which is aesthetically disadvantageous, or in the alternative requires installation into corresponding recesses inside a wall. However, those recesses need to be provided in said wall, which causes undesired additional installation effort.

In practice every 5-7 years buildings are reconstructed, rooms are shifted or cubicals are moved. Also in these cases re-wiring of wired switches is sometimes difficult and expensive. In some countries it is legally required to have a light switch installed. Having non-wired switches increases the degree of freedom to implementing a more efficient floor plan.

To address the problem of easy installation in combination with flexibility of installation, manufacturers of switching systems have suggested a way of wirelessly controlling lighting apparatuses. In one known system, and on/off switch is connected to a 433 MHz transmitter which sends a signal in response to detection of a switch action. The signal-receiving devices in said system are adapted to accordingly be turned on or off, depending on the transmitted signal. These transmission systems are usually installed as an upgrade and coupled to conventionally located and installed light switches on walls. The transmission units of these known systems require active supply of electrical power. To achieve said supply, these transmission units are typically fitted with batteries or use the electrical energy supplied to the switch. A problem generally associated with these known systems is that while improving flexibility over purely wire-bound lighting systems, the known systems still require a preexisting control switch to be mounted thereon which limits their flexibility. A further problem is seen in that these known systems can only provide basic switching functionality, e.g. on/off switching functionality, and are systematically not able to provide more complex control functions like for instance variation of light intensity or color.

SUMMARY OF THE INVENTION

It is thus an object of the invention to provide a system for wirelessly controlling electrical appliances, in particular for controlling lighting apparatuses, which allows for greater flexibility in installing and in particular also controlling the electrically appliances, in particular lighting apparatuses.

In a first aspect of the present invention, a system for wirelessly controlling an electrical appliance is presented, the system comprising an input unit comprising a user-operable command interface, and a control device which is connectable to said electrical appliance, wherein said input unit is located remotely from said control device, and said control device is adapted to detect a light signal being reflected off said command interface, to allocate said light signal to a predetermined command and to output said command to the electrical appliance. A key benefit of the invention is that the state of the input unit, in particular of the command interface, is actively monitored by the control device. By relying on the detection of light being reflected off said command interface, a very convenient way of command input is enabled. For initiating control of the electrical appliance, in particular lighting system, it is sufficient to manipulate the light reflexion off the command interface. In a basic embodiment, the light signal may be ambient light which is reflected off said command interface. Preferably, the light reflexion off said command interface is altered when the command interface is manipulated, for example by input from a user. The manipulation may preferentially be a displacement, deformation or shadowing of the command interface. The change in reflexion leads to a change in the signal which is detected by the remotely located control device. The signal change is registered by the control device and preferably processed into a corresponding control command for the electrical appliance, in particular lighting system.

Said manipulation of the command interface may be achieved without need of batteries or connection to the electrical wiring present in a building, which greatly increases flexibility of the system. Furthermore, any means for reflecting light are suitable for being used with the command interface. A key advantage is that in preferred basic embodiments, the command interface may simply consist of a sticker which can be applied virtually anywhere inside a room. In a preferred embodiment, the control device is adjustable in position and alignment such that light reflected off said command interface can be reliably detected. Preferentially, the control device is pivotable.

Preferably, said control device comprises at least one light sensor for detecting said light signal, and a processing unit connected to said sensor for allocating said light signal to said predetermined command. The light sensor is in one preferred embodiment a dedicated light sensor connected to said processing unit and adapted for directly receiving light reflected off said command unit.

In an alternatively preferred embodiment, the light sensor is incorporated in a camera comprising at least one optical element for directing said light signal towards said at least one light sensor.

Said control device preferentially comprises at least one camera, said camera comprising said at least one light sensor and at least one optical element for directing said light signal towards said at least one light sensor.

It is preferred if said control device comprises at least one light source, said light source being adapted to emit light towards said command interface. While a camera is one preferable option for a use in a control device cooperating with an input unit consisting of a reflecting sticker or comparable control switch, and in particular when mainly ambient light is used for reflecting off said command interface, it may be desirable to provide additional light which can be emitted towards the input unit for increasing the amount of light which can be reflected. For that purpose, it is preferred if said control device comprises said at least one light source. Said light source preferentially comprises at least one light emitting diode. It is further preferred if said light source comprises at least one laser, e.g. a diode laser. A laser allows for very precise alignment of the path of light between the control device and the input unit, in particular the command interface. The light source may be coupled into and guided through an optical system, for example the optical system of a camera or a dedicated optical system.

In a particularly preferred embodiment, said control device comprises an optoelectronic transducer, said transducer comprising said at least one light sensor, said light source and said processing unit. The optoelectronic transducer (OET) is preferably mounted on said electrical appliance, in particular lighting system, to be pivotable.

According to a further preferred embodiment, said processing unit is connected to said light source and adapted to generate and communicate a light code to said light source such that said light source emits light in said light code. Methods and apparatuses for generating code-carrying light signals are known from the applicant under the term "coded light". Exemplarily, mention is made of WO 2012/035469 A1 which discusses a coded light emitting device, and the entire content of which is included herein by reference, as well as to EP 2 509 398 A1 which discusses modulation for coded light transmission, the entire content of which also is incorporated herein by reference.

A particular advantage of the use of coded light is that it allows for interference-free operation of multiple interfaces to control one electrical appliance, in particular lighting system, and/or multiple control devices in close proximity to each other, for example inside one room of a building.

In a preferred embodiment, said processing unit is adapted to identify the reflected light signal by reading out and processing data from the at least one sensor, to allocate said light signal to a pre-determined control command and to communicate said control command to the electrical appliance, in particular lighting system. In one alternative, the allocation between the read-out signals is realized by means for referencing a look-up table wherein the look-up table comprises a set of data pairs, said data pairs respectively consisting of a read-out signal and a control command. Said look-up table is preferably provided per data storage means. In another alternative, one or more microelectromechanical systems (mems) are provided which are adapted to steer, i.e. direct the incoming light signal subsequently to different light-sensitive switches. Said switches are preferably adapted to communicate said control command, respectively, once light-activated. Said switches are preferentially configured to react to a specific light signal. The mem or mems preferably are adapted to cycle through all present switches, and to preferably focus on said switches. Only the switches corresponding to the respective specific light signal will react. For this procedure, no manual intervention is necessary, providing autonomous operation.

Said command interface preferably comprises at least one surface element which is adapted to reflect light towards said control device. The surface element preferably and in its simplest form is a sticker, or is a surface element installed within the input unit.

The at least one surface element is preferentially manipulable by at least one of the following:
shadowing at least a portion of said surface element,
changing the alignment of said surface element,
deforming the surface element,
changing the reflexion characteristics of said surface element.

By shadowing at least a portion of the surface element, the amount of light supplied to the surface element is minimized. This may be achieved by a moveable cover or in its simplest way, by manually obstructing the path of light between the control device and at least a portion of said surface element. This may for example be achieved by putting a thumb of a user on a portion of said surface element. The alignment of said surface element may be changed by providing the surface element on a moveable body. By changing the alignment, the angle of the surface element relative to the control device will typically be altered which changes the angle of reflexion, and accordingly the angle of total reflexion of the surface element such that the light intensity being reflected back towards the control device and in particular the light sensor will vary. Deformation of the surface element is preferably achieved by providing a temporarily and reversibly deformable material on the surface element, for example a foam which maintains its deformed shape for at least a predetermined amount of time after being manipulated. This so-called short term memorization of the user input improves signal readout for the control device in particular if there is a lot of ambient light interfering with the reflected signal. It will provide more time for a processing unit to identify the reflected signal. Also, deformation of said surface element will alter its reflexion characteristics.

In a further preferred embodiment, the command interface comprises a switch having multiple surface elements, and the switch is movable between different positions for respectively aligning one of the multiple surface elements such that light is reflected towards the control device.

Preferably, the remaining surface element or surface elements do not reflect light towards the control device. This way, a switch may be used which comprises a multitude of surface elements, each surface element representing a specific reflexion characteristic for being allocated to a specific operating command for the electrical appliance. In case of the electrical appliance being a lighting system, each surface element preferentially comprises a reflexion characteristic for being allocated to a dimming ratio, a color, blinking pattern or a set of lighting elements comprised in said lighting system which are to be switched in a group.

Preferably, each surface element has distinct reflexion characteristics, said characteristics being at least one of the following:
absolute reflectivity,
specific absorbance, direction of polarization of reflected light,
wavelength.

The reflexion characteristics mentioned here are also the reflexion characteristics which may be altered by manipulating the surface element or elements. By specific absorbance, the characteristic of absorbing light at certain wavelengths is understood. The specific absorbance may most easily be manipulated by providing a filter element, preferably a colored layer on the surface element which modifies the spectrum of light being reflected, or absorbed, respectively, off the surface element.

One preferred way of manipulating the at least one surface element is to apply a color-changing layer or foil to the surface element which changes in reaction to touch by a human finger, leading to absorption of certain wavelengths. The spectral change can then be registered by the control device.

According to a further preferred embodiment, said input unit comprises light coupling means, said light coupling means being located remote from said command interface, and means for guiding light between said command interface and said light-coupling means, wherein said coupling means is adapted to receive light from the light source as well as a reflected light signal from the command interface and to emit reflected light toward said light source.

Preferably, fiber optics are used as means for guiding light. Light may be coupled into and out of the means for guiding light by conventional measures. A particular advantage of this embodiment comprising light coupling means and means for guiding light is that it allows to limit possible interference of objects or persons crossing, e.g. by moving through the path of light between the control device and the input unit. If the input unit shall be attached to a wall such that a direct line of path between the control device and the input device, in particular the command interface, would likely be crossed by persons moving through the room, the use of light guiding means and light coupling means allows for rerouting the path light into an orientation which is no longer likely to be interfered with.

Preferably, the light guiding means or aligned such that the light coming for example from the light source of the control device is being transmitted to a region which is elevated with respect to the command interface and then transmitted downwards to the command interface through the light guiding means. In a particularly preferred embodiment, the light guiding means is oriented essentially vertically and extends upwards from the command interface, in particular if the electrical appliance to be controlled is a lighting system which is mounted on the ceiling of a room.

Said input unit preferably comprises an electronic control unit for manipulating said command interface as a function of user input, said electronic control unit comprising means for energy-harvesting the light being transmitted towards the command interface.

It is preferred for complex controlling options to electronically control the input unit for manipulating the command interface. For this purpose, the electronic control unit is provided with the input unit. In order to maintain the flexibility of the system and in particular the input unit as regards possible places for installation, the electronically controlled input unit is adapted to extract energy from the light being transmitted towards the command interface, which may be ambient light or, even more preferred, light transmitted from the light source located remotely at the control device.

In a preferred embodiment, the microcontroller is connected to an electrical power storage unit, and comprises means to branch off light coming into the switch e.g. towards the command interface, as well as means to convert said light energy into electrical power for storing in the electrical power storage unit. Said branching-off may be achieved by optical elements which guide the light coming into the switch in the direction of a corresponding energy converter such as a photovoltaic module.

The optical elements for redirecting the light coming into the switch preferentially are adjustable between an energy-harvesting position, in which light is directed towards the converter, and a standby position in which the light is directed towards the command interface. Alternatively or additionally, the optical elements may be adapted to only redirect a portion of the light coming into this switch such as energy harvesting and control of the electrical appliance, in particular lighting system, or carried out simultaneously.

In a further aspect of the present invention, a control device for use in a system as described hereinabove, in particular according to claim 1, is presented, wherein said control device is connectable to said electrical appliance, and adapted to detect a light signal being reflected off a command interface of an input unit located remotely from said control device, allocate said light signal to an operating command of said electrical appliance, and to output said command to the electrical appliance.

The invention according to this embodiment preferentially has the same preferred embodiments as the system described hereinabove. Consequently, reference is made to the above description also for preferred embodiments of the control device alone.

In a further aspect of the present invention, an input unit for use in a system as described hereinabove, in particular according to claim 1, is presented, said input unit comprising a user-operable command interface, said input unit being adapted to reflect a light signal off said command interface towards a control device which is located remotely from said input unit and connected to an electrical appliance.

The invention according to this embodiment preferentially has the same preferred embodiments as the system described hereinabove. Consequently, reference is made to the above description also for preferred embodiments of the input unit alone.

According to a further aspect of the invention, a method of controlling an electrical appliance is presented, said method comprising the steps of:

detecting a light signal being reflected off a command interface of an input unit, allocating said light signal to a predetermined command, and outputting said command to the electrical appliance.

The method according to this aspect profits from the same advantages as the system according to the invention described further hereinabove, to which thus reference is made. In particular, preferred embodiments of said method may comprise one, several or all of the steps of:

emitting light from a light source towards said command interface;

generating a light code, communicating said light code to said light source, and emitting said light in said light code;

identifying the reflected light signal by reading out and processing data from at least one sensor, allocating said light signal to a predetermined control command, and communicating said control command to the electrical appliance by means of a processing unit;

reflecting light off a surface element of the command interface towards said control device;

manipulating the command interface, in particular the surface element by at least one of the following:

shadowing at least a portion of said surface element, changing the alignment of said surface element, deforming the surface element, changing the reflexion characteristics of said surface element;

moving a switch between different positions for respectively aligning one of the multiple surface elements such that light is reflected towards the control device;

coupling light in light guiding means at a location remote from said command interface, guiding light between said coupling means and said command interface, emitting light reflected from the command interface toward said light source with the coupling means;

energy-harvesting the light being transmitted towards the command interface, preferably inside the input unit, for providing energy supply to the input unit, in particular an electronic control unit for manipulating said command interface.

In a further aspect, a computer program for operating a system for wirelessly controlling an electrical appliance as described hereinabove, in particular a system according to claim 1 is presented, the computer program comprising program code means for performing the method steps of the method of controlling an electrical appliance as described hereinabove, in particular the method according to claim 14, when the computer program is run on a computer controlling said system for wirelessly controlling an electrical appliance.

It shall be understood that the system for wirelessly controlling an electrical appliance, in particular of claim 1, the control device for use in a system for wirelessly controlling an electrical appliance, in particular according to claim 12, the input unit for use in a system for wirelessly controlling an electrical appliance, in particular according to claim 13, and the method of controlling an electrical appliance, in particular according to claim 14 and the computer program according to claim 15 have similar and/or identical preferred embodiments, in particular, as defined in the dependent claims.

It shall further be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
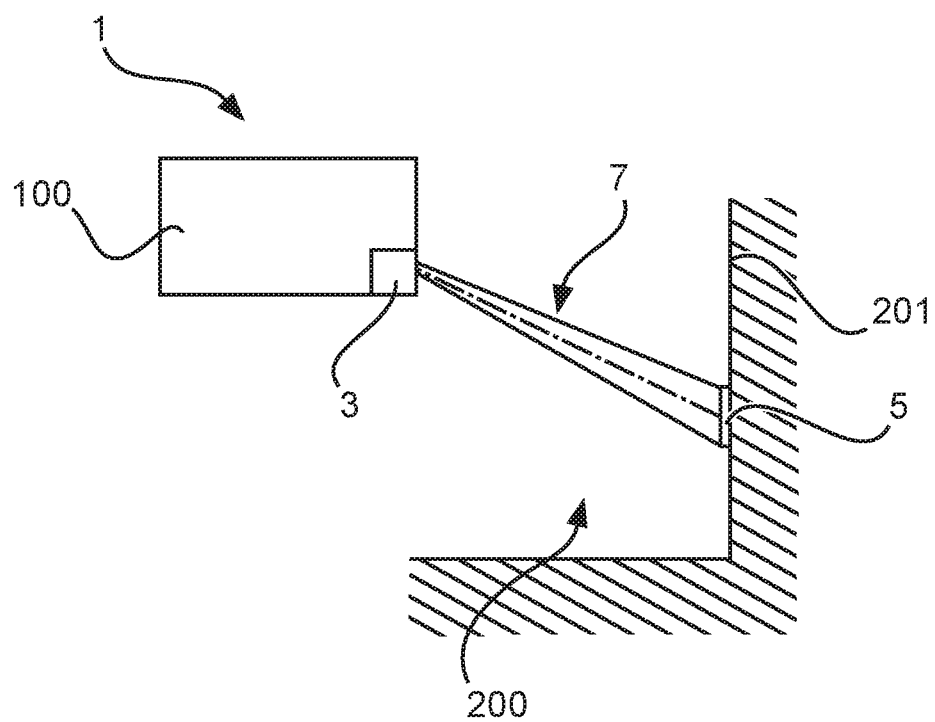
FIG. 1 shows schematically and exemplarily a system for wirelessly controlling an electrical appliance according to a first embodiment.

FIG. 1 depicts a system 1 for wirelessly controlling an electrical appliance 100. The system 1 comprises a control device 3 and an input unit 5. The control device 3 is connectable, and in FIG. 1 connected to, the electrical appliance 100. The input unit 5 is located remotely from said control device 3. In FIG. 1, input unit 5 is located on a wall 201 of a room 200.

Figure 2:
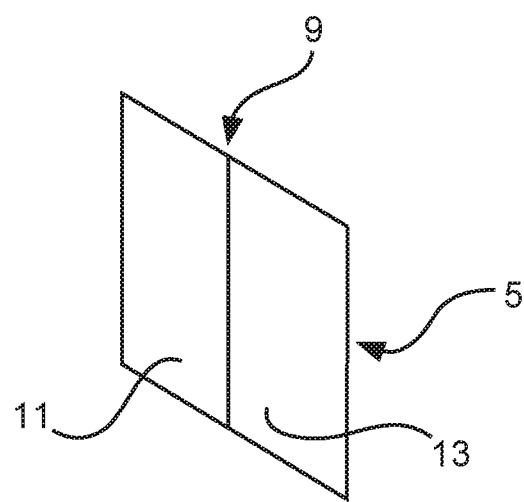
FIG. 2 shows schematically and exemplarily a detail of the system according to FIG. 1.

Control unit 3 in FIG. 1 is adapted to detect, in direct line of sight, symbolized by light path 7, a light signal being reflected off said input unit 5. Details of said input unit 5 are shown in FIG. 2. Input unit 5 comprises a command interface 9. Said command interface 9 comprises a first surface element 11 and a second surface element 13 attached adjacent to the first surface element 11. Preferably, the reflexion characteristics of the first surface element 11 differ from the reflexion characteristics of the second surface element 13. If the command interface 9 is manipulated, e.g. by placing a finger on one of the two surface elements 11, 13, the control device 3 which preferably comprises a camera for detecting said change in reflexion. Since reflexion characteristics for both surface elements 11, 13 are distinct; the change in reflexion will also be different, depending on which surface element 11 or 13 is partly covered by said finger.

Figure 3:
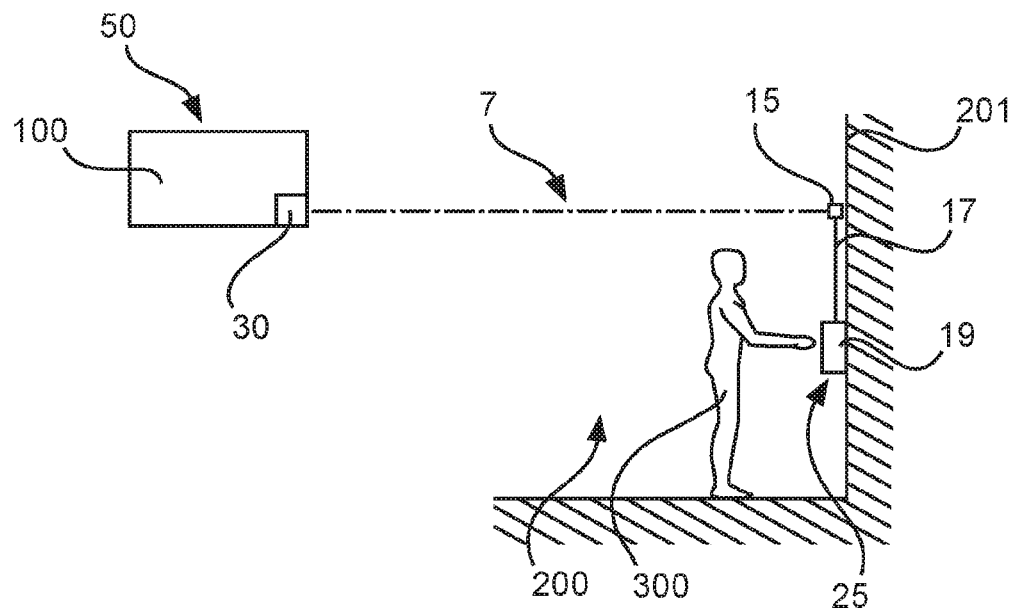
FIG. 3 shows schematically and exemplarily a system for wirelessly controlling an electrical appliance according to a second embodiment.

A second embodiment is shown in FIG. 3. Here, a system 50 for wirelessly controlling an electrical appliance is shown. The system 50 is in large parts identical to system 1 of FIG. 1. Elements which are identical or have similar function are nominated with identical reference signs for that reason. The system 50 shown in FIG. 3 comprises a control device 30 which is connectable, and in FIG. 3 connected to an electrical appliance 100. System 50 further comprises an input unit 25. Input unit 25 is according to FIG. 3 attached to a wall 201 of room 200. The input unit 25 comprises a command interface 19 which is manipulable by a user 300.

In contrast to the system of FIGS. 1 and 2, the light path 7 in FIG. 3 does not take the direct line of sight between control device 30 and command interface 19 of input unit 25. Instead, the command interface 19 of input unit 25 is coupled to means for guiding light 17, preferably fiber optics, which are also located on said wall 201. At a location remote from the command interface 19, means 15 for coupling light in and out of said light guiding means 17 are provided. The light path 7 extends from the control device 30 to said coupling means 15 in such way that movement of person 300 inside room 200 does not impede signal transmission between control device 30 and coupling means 15 of the input unit 25. It is thus preferred if the means 17 for guiding light extend upwards from the command interface.

Figure 4:
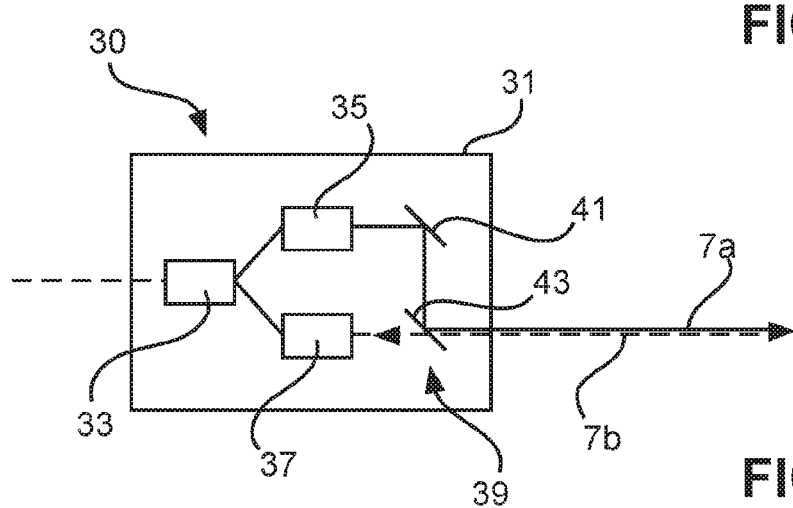
FIG. 4 shows schematically and exemplarily a detail of the system according to FIG. 3.

FIG. 4 depicts a detailed schematic view of control device 30. Control device 30 comprises a processing unit 33. That processing unit 33 is connected for signal transmission to a light source 35, which preferably is a light emitting diode (LED) or a diode laser. Also, said processing unit 33 is connected for signal transmission to a light sensor 37. The control device 30 further comprises an optical system 39 for coupling light in and out of the control device 30.

The optical system 39 comprises a first mirror 41 and a second mirror 43. First and second mirror 41, 43 are aligned such that light emitted from the light source 35 is coupled out of the control device 30. The light then takes the path as indicated by arrow 7a. Light being reflected off said command unit towards said control device is coming back in the direction of arrow 7b. Preferably, mirror 43 is semitransparent such that the reflected light signal is transmitted through said mirror 43 onto said light sensor 37.

The processing unit 33 is adapted to read out the data corresponding to the detected light signal from the light sensor 37 and allocate a control command corresponding to said light signal. Preferably, said control commands and corresponding light signals are provided per data storage.

Upon allocation, said processing unit 33 is preferably adapted to output said control command to the electrical appliance. In a preferred embodiment, shown in FIG. 4, the processing unit 33 as well as the light sources 35 and the light sensor 37 are part of an optoelectronic transducer 31.

Figure 5:
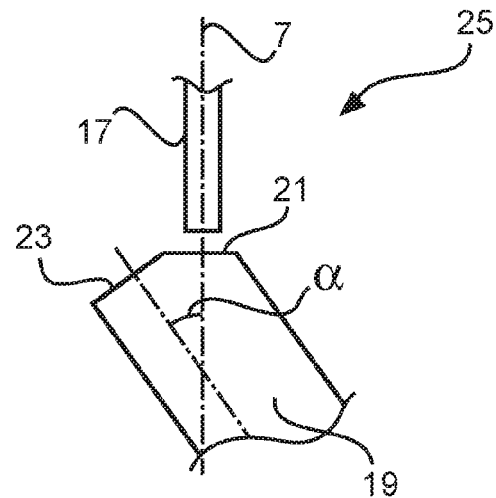
FIG. 5 shows schematically and exemplarily a further detail of the system according to FIG. 3.

In FIG. 5, there is further shown a detail view of the input unit 25 also shown in FIG. 3. The command interface 19 of input unit 25 comprises a pivotable switch. Two surface elements 21, 23 are attached on the command interface 19. In the stage shown in FIG. 5, a first surface element 21 is aligned towards means 17 for guiding light such that light is being transmitted along light path 7 onto said surface element 21 and reflected back into the means 17 for guiding light.

By pivoting the command interface 19 by angle α, surface element 21 is moved away from the light path 7. Instead, surface element 23, which is a second surface element, is moved into said light path 7 with the effect that light is being transmitted onto and reflected off said second surface element 23 into said means 17 for guiding light. The reflexion characteristics of the second surface element preferably differ from the reflexion characteristics of the first surface element.

Figure 6:
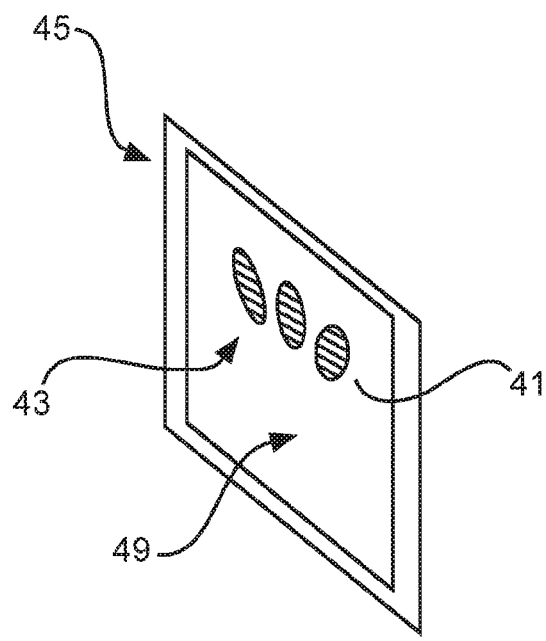
FIG. 6 shows schematically and exemplarily an input unit according to a further embodiment.

In FIG. 6, a further embodiment of an input unit is shown. Input unit 45 comprises a command interface 49. Said command interface 49 comprises a surface element 41. Said surface element 41 is manipulable such that upon manipulation, a second surface element 43 is temporarily formed on said first surface element. The manipulation preferably consists in a deformation, e.g. by impressing an object such as a finger into the surface element 41, or by color change, for example by temperature-induced color change as a response to fingerprinting. Since the reflexion characteristics of the second surface element 43 differ from the reflexion characteristics of the first element 41, the light reflexion off the command interface 49 in total will vary depending on the manipulation. The more deformation or coloring is employed, the more said reflexion will vary, thus enabling a nuanced reflexion signal manipulation.

Figure 7:
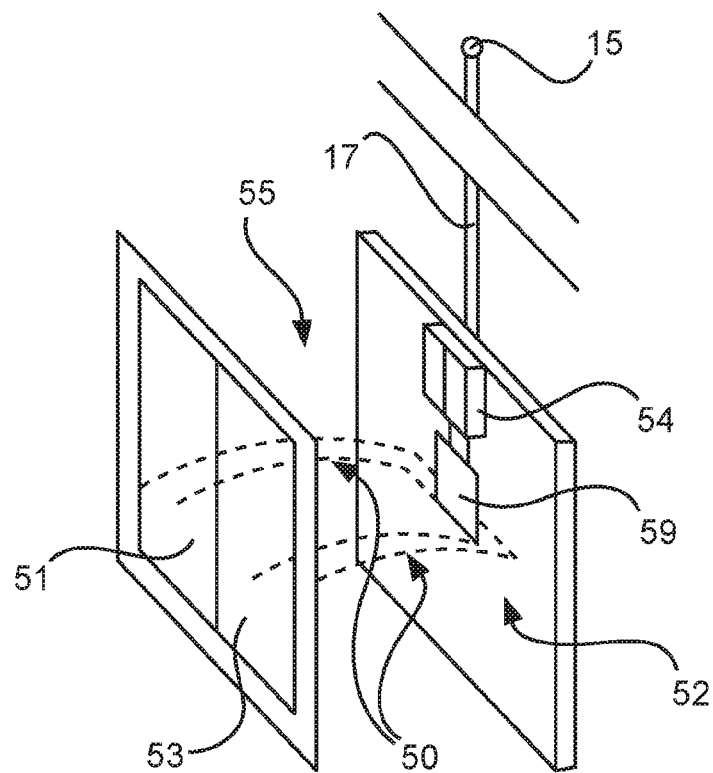
FIG. 7 shows schematically and exemplarily an input unit according to a further embodiment.

FIG. 7 shows a further embodiment of an input unit. Input unit 55 comprises a command interface 59. Said command interface 59 is connected by wires 50 to a first surface element 51 and a second surface element 53. Manipulation of said surface elements 51, 53, e.g. by pushing or touching, is registered by an electronic control unit 52 which in turn causes a manipulation of the command interface 59. A microcontroller is preferably provided for performing the control operations. As the input unit 55 according to this embodiment is not entirely passive but instead requires a (however minimal) amount of electrical energy supply, a means 54 for energy-harvesting is provided with said electronic control unit 52. The means 54 for energy-harvesting are adapted to selectively branch-off or redirect light being transmitted towards the command interface 59 through said means 17 for guiding light, coming from said means 15 for coupling light into the means 17 for guiding light.

Figure 8:
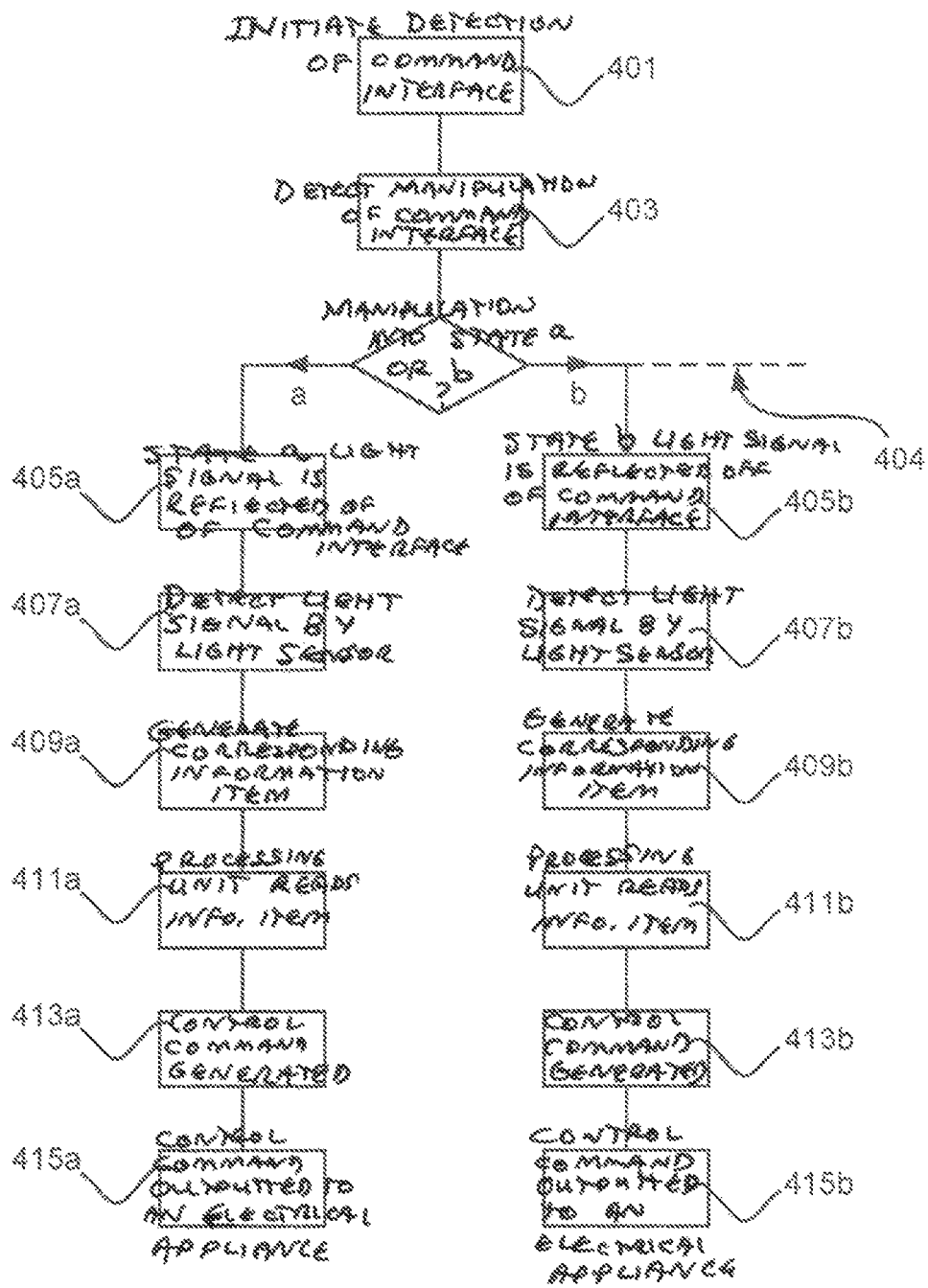
FIG. 8 shows schematically and exemplarily a flowchart of a method of wirelessly controlling an electrical appliance.

FIG. 8 shows a flowchart of a method of wirelessly controlling an electrical appliance. In step 401, detection of a command interface is initiated. In step 403, said command interface is manipulated into either state a or state b. This is shown in line 404. Depending on the layout of the command interface and the input unit bearing said command interface, more than the two positions a, b shown in FIG. 8 are possible. For the sake of simplicity, the description of the method is however restricted to these two alternatives. In step 405a, a light signal resulting from the manipulation into state a is reflected off said command interface. In step 405b instead, a light signal representative of state b is reflected off said command interface. In step 407a, said light signal representative of state a is detected by a light sensor. Similarly, in state b, the light signal is detected by a light sensor in step 407b. An information item corresponding to said detected signal is generated in steps 409 a and b, and read out by a processing unit in step 411a,b.

The processing unit then allocates in steps 413a,b a control command to the light signal representing either state a or state b of the command interface, and in the final step 415a,b outputs said allocated control command to an electrical appliance.

Procedures like the detection of a light signal being reflected off a command interface of an input unit, allocating said light signal to a predetermined command, and outputting said command to the electrical appliance et cetera performed by one or several units or devices may be performed by any other number of units or devices.

In the above description of the invention an electrical appliance has been generally described. According to further preferred embodiments, in particular a lighting system comprising one or more light sources may be used as specific example of an electrical appliance.

The procedures and/or control of the system and/or of the control device in accordance with the method as herein described for wirelessly controlling an electrical appliance can be implemented as program code means of a computer program and/or as dedicated hardware.

Other variations to the disclosed embodiments can be understood and effected by those skilled in the art in practicing the claimed invention, from a study of the drawings, the disclosure, and the appended claims.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

If in this document the wording "and/or" is used, it is understood that one of the elements or both elements are included.

The invention claimed is:

1. A system for wirelessly controlling an electrical appliance, comprising:
   an input unit comprising a user-operable command interface and
   a control device which is connectable to said electrical appliance, wherein said input unit is located remotely from said control device, and
   characterized in that said control device is adapted to detect a light signal, said light signal being ambient light reflected off said command interface, to allocate said light signal to a predetermined command and to output said command to the electrical appliance.

2. The system of claim 1, wherein said control device comprises at least one light sensor for detecting said light signal, and a processing unit connected to said sensor for allocating said light signal to said predetermined command.

3. The system of claim 2, wherein said processing unit is connected to said light source and adapted to generate and communicate a light code to said light source such that said light source emits light in said light code.

4. The system of claim 1, wherein said control device comprises at least one camera, said camera comprising said at least one light sensor and at least one optical element for directing said light signal towards said at least one light sensor.

5. The system of claim 1, wherein said control device comprises at least one light source, said light source being adapted to emit light towards said command interface.

6. The system of claim 5, wherein said control device comprises an optoelectronic transducer, said transducer comprising said at least one light sensor, said light source and said processing unit.

7. The system of claim 1, wherein said command interface comprises at least one surface element which is adapted to reflect light towards said control device.

8. The system of claim 7, wherein said surface element is manipulable by at least one of the following:
   shadowing at least a portion of said surface element,
   changing the alignment of said surface element,
   deforming the surface element,
   changing the reflexion characteristics of said surface element;
   wherein manipulation of said at least one surface element affects characteristics of the reflected light.

9. The system of claim 7, wherein the command interface comprises a switch having multiple surface elements, and the switch is movable between different positions for respectively aligning one of the multiple surface elements such that light is reflected towards the control device element;
   wherein said different positions of the switch affects characteristics of the reflected light.

10. The system of claim 9, wherein said input unit comprises an electronic control unit for manipulating said command interface as a function of user input, said electronic control unit comprising means for energy-harvesting the light being transmitted towards the command interface.

11. The system of claim 7, wherein said input unit comprises light coupling means, said light coupling means being located remote from said command interface, and means for guiding light between said command interface and said light-coupling means, wherein said coupling means is adapted to receive light from the light source as well as a reflected light signal from the command interface and to emit reflected light toward said light source.

12. A control device for use in a system according to claim 1, wherein said control device is connectable to said electrical appliance, and adapted to
   detect a light signal, said light signal being ambient light reflected off a command interface of an input unit located remotely from said control device,
   allocate said light signal to an operating command of said electrical appliance, and to
   output said command to the electrical appliance.

13. An input unit for use in a system according to claim 1, comprising a user-operable command interface, said input unit is adapted to reflect a light signal, said light signal being ambient light, off said command interface towards a control device which is located remotely from said input unit and connected to an electrical appliance.

14. A method of controlling an electrical appliance, comprising the steps of:
   detecting a light signal, said light signal being ambient light reflected off a command interface of an input unit,
   allocating said light signal to a predetermined command, and
   outputting said command to the electrical appliance.

15. A computer program product comprising program code, stored in a non-transitory computer readable medium for performing the method steps of the method of controlling an electrical appliance according to claim 14 when the computer program is run on a computer.

* * * * *